United States Patent
Mussot

(10) Patent No.: US 9,510,354 B2
(45) Date of Patent: Nov. 29, 2016

(54) METHOD AND A DEVICE FOR LOW INTRUSIVE FAST ESTIMATION OF THE BANDWIDTH AVAILABLE BETWEEN TWO IP NODES

(71) Applicant: Orange, Paris (FR)

(72) Inventor: Laurent Mussot, Paris (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/408,245

(22) PCT Filed: Jun. 14, 2013

(86) PCT No.: PCT/FR2013/051397
§ 371 (c)(1),
(2) Date: Dec. 15, 2014

(87) PCT Pub. No.: WO2013/186502
PCT Pub. Date: Dec. 19, 2013

(65) Prior Publication Data
US 2015/0189659 A1  Jul. 2, 2015

(30) Foreign Application Priority Data
Jun. 15, 2012 (FR) .................................. 12 55630

(51) Int. Cl.
*H04L 12/28* (2006.01)
*H04W 72/04* (2009.01)
(Continued)

(52) U.S. Cl.
CPC ........ *H04W 72/0486* (2013.01); *H04L 43/087* (2013.01); *H04L 43/0894* (2013.01); *H04L 47/283* (2013.01); *H04W 24/10* (2013.01)

(58) Field of Classification Search
CPC ....... H04L 43/00; H04L 43/02; H04L 43/08; H04L 43/0852; H04L 43/087; H04L 43/0894; H04L 47/283; H04W 24/00; H04W 24/08; H04W 24/10; H04W 72/0486
See application file for complete search history.

(56) References Cited

U.S. PATENT DOCUMENTS 7,768,933 B2 * 8/2010 Chang ................. H04L 43/0858
370/252
2004/0001511 A1  1/2004 Matta
(Continued)

FOREIGN PATENT DOCUMENTS

WO  2008073610 A1  6/2008

OTHER PUBLICATIONS

French Search Report and Written Opinion dated Jan. 17, 2013 for corresponding French Application No. 1255630, filed Jun. 15, 2012.
(Continued)

*Primary Examiner* — Anh Ngoc Nguyen
(74) *Attorney, Agent, or Firm* — David D. Brush; Westman Champlin & Koehler, P.A.

(57) ABSTRACT

A method and a device are provided for estimating the bandwidth available at the level of the IP layer for a stream between a source node and a destination node connected by a path made up of one or more links. The stream is transported by a heterogeneous telecommunications network that may include at least one radio segment over a portion of the path. The method includes: a receive step of the destination node receiving a single train of N packet frames, at a certain constant or variable send rate; a determination step of the destination node determining accumulated reception delay values; an identification step of the destination node identifying atypical jitter values among the successive packet transmission delays; and a utilization step of the destination node using a regression model applied to the accumulated reception delay values.

10 Claims, 8 Drawing Sheets

(51) Int. Cl.
*H04L 12/841* (2013.01)
*H04L 12/26* (2006.01)
*H04W 24/10* (2009.01)

(56) References Cited

U.S. PATENT DOCUMENTS

2010/0157834 A1* 6/2010 Keromytis .......... H04L 41/0896
370/252
2013/0058248 A1* 3/2013 Singh .................. H04L 43/0876
370/252

OTHER PUBLICATIONS

International Search Report and Written Opinion dated Jul. 30, 2013 for corresponding International Application No. PCT/FR2013/051397, filed Jun. 14, 2013.
International Preliminary Report on Patentability and English translation of the Written Opinion dated Dec. 16, 2014 for corresponding International Application No. PCT/FR2013/051307, filed Jun. 14, 2013.
Madsen et al., "Methods for non-linear least squares problems" (2004).
Li et al., "WBest: a bandwidth estimation tool for IEEE 802.11 wireless networks" in Proc. of IEEE LCN, 2008.

* cited by examiner

METHOD AND A DEVICE FOR LOW INTRUSIVE FAST ESTIMATION OF THE BANDWIDTH AVAILABLE BETWEEN TWO IP NODES

CROSS-REFERENCE TO RELATED APPLICATIONS

This application is a Section 371 National Stage application of International Application No. PCT/FR2013/051397, filed Jun. 14, 2013, the content of which is incorporated herein by reference in its entirety, and published as WO 2013/186502 on Dec. 19, 2013, not in English.

FIELD OF THE INVENTION

The present invention relates to low intrusive fast bandwidth estimation (LIFBE) in the field of telecommunications. Within this field, the invention relates more particularly to techniques for estimating the available bandwidth on the basis of transmitting a plurality of high speed packets between a send node and a destination node that are connected by a telecommunications network. The present invention relates to the family of methods known as "active probing techniques". Internet protocol (IP) packets are transported over a path that has been established between the send node and the destination node in a network made up of a plurality of links, each of which may be wired or wireless. Some of the links in this path may present capacity characteristics that vary with variations in the environment. For example, the capacity of a wireless link may vary depending on the radio conditions that have an impact on the maximum data send rate over the air channel, depending on the modulation and the coding used. Furthermore, the load on each link representing existing traffic (known as "cross traffic") can also vary over time, in particular when a common link is shared with other IP streams. The bandwidth available on each link, defined as the capacity minus the cross traffic for each link, thus becomes variable.

In this application, the capacity and the available bandwidth of a network having a plurality of links are defined at the level of the IP layer between a send node and a destination node. A link represents a relationship between two nodes at the protocol level of the open systems interconnection (OSI) layers, typically level 3 with the IP layer (network layer), or a lower level, e.g. with the media access control (MAC) layer (data link layer) of the transport technology in use. When the link in question refers to level 3 of the IP layer, the term IP "hop" may be used. When the link in question refers to a lower level, e.g. to the level 2 of the MAC layer, the term "segment" may be used. FIG. 1 is a diagram of a conventional configuration in the reference model of OSI protocol layers when the two nodes are fixed terminals. The level 3 IP layer provides a path between the two nodes, which path is shared between IP hops that are defined on passing through a router, such that a hop in this configuration is a link between a node and a router or between two routers. FIG. 2 is a diagram of a conventional configuration in the same model when one of the two nodes is a mobile terminal. FIG. 3 is a diagram of a conventional configuration in the same model when both nodes are pieces of fixed equipment in the transport network.

A network hop (level 3) sends data in the form of IP packets at a rate (generally expressed in kilobits per second (kbit/s or megabits per second (Mbit/s)) that is less than the rate offered by the level 2 layer, given the signaling overhead associated with the encapsulation and with the framing that is associated with changing layers. A level 3 IP hop may in turn be made up of a plurality of level 2 segments specific to each transport technology used, such as Ethernet or WiFi, for example. The time $\Delta_{L3}$ required for sending an IP packet of size $L_{L3}$ is given by the following equation:

$$\Delta_{L3} = \frac{L_{L3} + H_{L2}}{C_{L2}} \quad (1)$$

where $H_{L2}$ is the signaling overhead (expressed as a number of bytes) associated with changing layer from level 2 to level 3 and corresponding to encapsulating the IP packets, and with $C_{L2}$ being the capacity at the level 2 layer of the segment that has the smallest transmission capacity in the corresponding hop.

The capacity at the level 3 layer is then given by the following equation:

$$C_{L3} = \frac{L_{L3}}{\Delta_{L3}} = \frac{L_{L3}}{(L_{L3} + H_{L2})} C_{L2} \quad (2)$$

Thus, the capacity of an IP link corresponding to the level 3 layer may be determined by the capacity of the segment in the level 2 layer that has the smallest capacity, depending on transmission characteristics specific to the physical medium and to the technology used. Thus, the Fast Ethernet 100BASE-TX technology of the IEEE 802.3 standard may, by way of example, send over the level 2 layer at a maximum data rate of 100 Mbit/s. The capacity of an IP link is considered in this application as being its maximum capacity, i.e. the capacity that corresponds to the maximum size $L_{L3}$, i.e. $L_{L3}$=MTU, where MTU stands for "maximum transmission unit" and is equal to 1500 bytes.

The effective capacity $C_e$ of a network defining the path between a send node and a destination node with H IP hops is limited by the capacity of the smallest-capacity link, (also known as the narrow link):

$$C_e = \min_{h=1, \ldots, H} \{C_h\}$$

The available bandwidth $A_b$ of a network having a plurality of links is defined as corresponding to the unused capacity of the narrowest link (also known as the "tight" link) for a given time interval. The tight link of a network corresponds to the IP hop having the smallest available bandwidth. The available bandwidth $A_b$ depends on the load of IP cross traffic $R_x$ and may be considered as the maximum increase in data rate that can be introduced without disturbing the already existing $R_x$ load. Thus, the available bandwidth $A_b$ of an end-to-end network corresponds to the lowest of the bandwidths available in the various IP hops:

$$A_b = \min_{h=1, \ldots, H} \{A_i\} = C_t - R_x$$

In the example of a network made up of three IP hops as shown in FIG. 4, the total available bandwidth is equal to the unused capacity of the first link since it is the tight link: $A_b = A_1$. The capacity of the tight link is written $C_t$. The hop with the smallest capacity is the third link since its capacity is the smallest: $C_e = C_3$. The total available bandwidth under such circumstances is not associated with the link having the lowest capacity.

When $C_e = C_t$, the narrow link is also the tight link, and it is commonly referred to as a "bottleneck" link.

The data of an IP stream may correspond to images, in which case it comprises video data, it may correspond to sound, in which case it comprises audio data, it may correspond to information, in which case it constitutes plain data, or it may correspond to any other source of any kind.

Information about the available bandwidth in a network at a given instant may be used to achieve several objectives. By way of example, mention may be made of improving quality of service (QoS), improving routing, and detecting network problems. Tools have existed for many years for obtaining this type of information, but in general they have been designed exclusively for the wired situation and they are not suitable for an environment that is itself varying, such as that encountered with wireless or mobile networks, given their consumption of time. In addition, the growth of various telecommunications networks and their increasing utilization have given rise to the concept of a network that is heterogeneous, being based on complementarity between various different radio access technologies (cellular networks of the 3GPP 2G/3G/4G type, WiFi networks of the IEEE 802.11a/b/g/n/ . . . type, Wimax networks of the IEEE 802.16/ . . . type, etc.). The concept of a heterogeneous network is applicable in particular to an objective of extending radio coverage and increasing capacity. User mobility leads to variations in the traffic handled by an access network. These variations can lead to saturation. In order to prevent such saturation, it would appear to be advantageous to be able to off-load an access network at a given instant. For this purpose, proposals have been made to off-load traffic from one network to another, e.g. by off-loading traffic from a user of a cellular network to an available WiFi local network. In particular, the 3GPP standards TS 23.402, TS 24.302, and TS 24.312 specify aids for deciding how terminals should select an access network by using an access network discovery selection function (ANDSF) that makes use of information about the statuses and the locations of various available non-3GPP access networks. In another context, specifically a European context and in agreement with Mandate M/453 under the supervision of the International standards organization (ISO), the European committee for standardization (CEN), and the European telecommunications standards institute (ETSI), new intelligent transport system (ITS) standards have been developed, mainly for improving road safety and managing road traffic, and for giving access to the Internet. These ETSI ITS standards include the institute of electrical and electronic engineers (IEEE) 802.11p standard known as vehicular WiFi; they define an architecture for use by cars or any other transport vehicle and they set out to be complementary to already-existing radio access networks (cellular networks, wireless local area networks (WLANs), etc.). Once more, the complementarity associated with mobility takes advantage of the usefulness of a mechanism for selecting radio access. The most pertinent decision criteria that are generally taken into consideration are received signal quality and available bandwidth.

PRIOR ART

In order to obtain an estimate of the available bandwidth, there exists a tool known as WBest that is designed mainly for WiFi type wireless networks, and a description of that tool is given in [Ref1], which tool forms part of a family of techniques for direct access probing. It makes it possible to estimate the bandwidth available between two nodes of a network by sending internet protocol and user datagram protocol (IP/UDP) packets referred to as "probes" that are analyzed on reception by the second node. The Wbest tool has two stages of transmission as shown in FIG. 5: a first stage during which a series of packet pairs are sent and a second stage during which a train of packets is sent at the data rate corresponding to the capacity as determined during the first stage. The received pairs of packets serve to measure the various time offsets between the two packets of each pair. A median value for these time offsets serves to determine an effective capacity $C_e$ corresponding to the narrow link. The sender needs to wait for the effective capacity as determined by the receiver to be returned before beginning the second stage. Consequently, the total time required for estimation includes the two send stages and two returns of information.

The final result depends strongly on the estimated effective capacity (Ce) obtained during the first stage, given firstly that this estimate of the effective capacity Ce serves to determine the rate at which the packets in the train of the second stage are sent, and secondly that the effective capacity (Ce) is used directly in the formula for the final calculation of the available bandwidth. The calculation is given by the following formula, where $A_b$ corresponds to the available bandwidth, Ce to the effective capacity, and R to the mean reception dispersion rate of the train of packets:

$$A_b = C_e\left(2 - \frac{C_e}{R}\right) = 2C_e + \frac{C_e^2}{R}$$

The lack of accuracy concerning Ce, which is obtained by calculation the median of various instantaneous data rates received during the first stage can lead to the available bandwidth $A_b$ being underestimated if the estimated capacity is smaller than the real capacity, since the rate at which the train of packets is sent during the second stage is then too small. Furthermore, an error in estimating the capacity Ce has a strong impact on the final result, given that Ce is squared in the formula for obtaining the available bandwidth. By way of example, this impact occurs more particularly if the cross traffic is too great, or if the maximum capacity is varying fast, e.g. as a result of a change of modulation. Furthermore, the calculated available bandwidth $A_b$ for a heterogeneous network is valid only if the effective capacity corresponds to the radio link, which is not always the case.

Furthermore, the use of the Wbest tool on a cellular network does not take any account of data rate being regulated and traffic smoothed (also know as "traffic shaping" and "traffic policing") as performed within the mobile core network, where such actions may take place after the probes have been sent. Nor does it take account of the relationship between the measured receive data rate and the number of packets sent, since the limit is not necessarily reached while transmitting the train of IP/UDP packets of the probes. The formula for calculating available bandwidth is thus not suitable for a mobile network.

SUMMARY OF THE INVENTION

An exemplary embodiment of the present invention proposes a method of estimating the bandwidth available at the level of the IP layer for a path between two nodes, the path being defined by a network made up of one or more physical wired or wireless links, which method is faster and less intrusive than known methods.

Thus, an exemplary embodiment of the invention provides a method of estimating the bandwidth available at the level of the IP layer for a stream between a send node and a destination node that are connected by a path made up of one or more links, the estimation being performed on the basis of a single train of N IP/UDP packet frames generated at a certain send rate. The stream is transported by a telecommunications network that may include at least one radio segment over a portion of the path. The network may transport other IP streams over all or a portion of the path. The method comprises:

- a receive step of the destination node receiving the single train of N packet frames, a frame comprising: a field with the IP address of the send node, a field with the IP address of the destination node, a field associated with the send format of the frame, a packet of size L including a timestamp field referred to as the input transmitting time $t_n^i$, and a field with the number n of the packet corresponding to the number n of the frame in the train, for n=1 to N, reception of a frame n triggering the packet n being associated with a timestamp value referred to as the output receiving time $t_n^o$;
- starting from the second received packet, a determination step of the destination node determining accumulated reception delay values on reception of the packet n, with n=2 to N:

$$T_{(n-1)} = t_n^o - t_1^o$$

- an identification step of the destination node identifying atypical values of jitter, $Jitter_n$, between the transmission delays of successive packets, $$Jitter_{(n-1)} = (t_{n+1}^o - t_{n+1}^i) - (t_n^o - t_n^i)$$

- a utilization step of the destination node using a regression model applied to the accumulated reception delays as a function of an accumulated transmission delay and knowing the atypical jitter values.

An exemplary embodiment of the invention also provides a device for a telecommunications network, which device is adapted to a method of estimating the bandwidth available at the level of the IP layer from a single train of N IP/UDP packet frames generated at a certain send rate, for a stream between a node source and the device, which are connected by a path made up of one or more links. The stream is transported by a telecommunications network that may include at least one radio segment over a portion of the path. The network may transport other IP streams over all or a portion of the path. The device comprises:

- receive means for receiving a single train of N packet frames, a frame comprising: a field with the IP address of the send node, a field with the IP address of the destination node, a field associated with the send format of the frame, a packet of size L including a timestamp field referred to as the input transmitting time $t_n^i$, and a field with the number n of the packet corresponding to the number n of the frame in the train, for n=1 to N, reception of a frame n triggering the packet n being associated with a timestamp value referred to as the output receiving time $t_n^o$;
- determination means for determining values of accumulated reception delays $T_{(n-1)}$ on reception of the respective packets n and starting from the second received packet, with n=2 to N:

$$T_{(n-1)} = t_n^o - t_1^o$$

- identification means for identifying atypical jitter values, $Jitter_{(n-1)}$, between the transmission delays of successive packets, $$Jitter_{(n-1)} = (t_{n+1}^o - t_{n+1}^i) - (t_n^o - t_n^i)$$

- utilization means for using a linear regression model applied to the accumulated reception delays approximated by the relationship:

$$T_x = a_i x + b_i$$

corresponding to a segment i identified by two successive values of atypical values for transmission delay jitter with:

$$A_b = C_e \left(1 - \frac{a}{L} \, Sendrate\right) + Sendrate$$

An exemplary embodiment of the invention also provides a telecommunications system for implementing a method of estimating bandwidth available at the level of the IP layer from a single train of N IP/UDP packet frames generated at a certain send rate, for a stream between a node source and a destination node connected by a path made up of one or more links of an embodiment of the invention. The system comprises:

- a source node and a destination node connected by a path that may include at least one radio segment, wherein the destination node comprises:
- receive means for receiving a single train of N packet frames, a frame comprising: a field with the IP address of the send node, a field with the IP address of the destination node, a field associated with the send format of the frame, a packet of size L including a timestamp field referred to as the input transmitting time $t_n^i$, and a field with the number n of the packet corresponding to the number n of the frame in the train, for n=1 to N, reception of a frame n triggering the packet n being associated with a timestamp value referred to as the output receiving time $t_n^o$;
- determination means for determining values of accumulated reception delays $T_{(n-1)}$ on reception of the respective packets n and starting from the second received packet, with n=2 to N−1:

$$T_{(n-1)} = t_n^o - t_1^o$$

- identification means for identifying atypical jitter values, between the transmission delays of successive packets:

$$Jitter_{(n-1)} = (t_{n+1}^o - t_{n+1}^i) - (t_n^o - t_n^i)$$

- utilization means for using a linear regression model applied to the accumulated reception delays approximated by the relationship:

$$T_x = a_i x + b_i$$

corresponding to a straight line segment i identified by two successive values of atypical values for jitter with:

$$A_b = C_e \left(1 - \frac{a}{L} \, Sendrate\right) + Sendrate$$

In an exemplary embodiment of the invention, the destination receives a train of data packets each encapsulated in a UDP frame, the packets also being referred to as "probes", and it receives them at a certain rate that may be constant or variable, as previously determined by the sender. If the rate is constant, it is higher than the effective capacity.

On receiving a packet n, where n is incremented by one for each packet, the destination associates an output receiving time $t_n^o$ (which may be relative or absolute), and it extracts from the packet n its transmitting time. The send rate may be determined by the destination by observing the transmitting times contained in the IP/UDP packets:

$$Sendrate = \frac{L}{t_{n+1}^i - t_n^i}$$

The destination determines an accumulated reception delay:

$$T_{(n-1)} = t_n^o - t_1^o$$

and also an accumulated transmission delay $(t_n^i - t_1^i)$ starting from packet n=2 and until packet n=N is received.

Thus, for each received packet starting from the second, as identified by its number n, the destination obtains an accumulated reception delay value and an accumulated transmission delay value.

In an exemplary embodiment of the invention, the accumulated reception delay curve for $T_{(n-1)}$ is interpolated by piecewise regression, with each piece being defined by the previously identified atypical jitter values.

When the send rate is constant, the regression is of the linear type. The accumulated reception delays are approximated by the relationship:

$$T_x = a_i x + b_i$$

for each straight line segment i defined by atypical jitter values. The coefficients determine by linear regression for the various straight line segments, i.e. the slopes $a_i$ and the intercepts $b_i$ in the expressions:

$$T_x = a_i x + b_i$$

make it possible to determine the available bandwidth $A_b$ knowing the effective capacity $C_e$ and knowing the fixed size L of a packet:

$$A_b = C_e\left(1 - \frac{a}{L} \, Sendrate\right) + Sendrate$$

Depending on the embodiment, the final value of a may be weighted and averaged on the basis of the most recent values for $a_i$.

When the send rate is variable, the send rate varies as a function of time, increasing depending on the model selected by the sender (e.g. in linear manner), and at a given instant its value becomes equal to the available bandwidth. At that instant, the way the network transmits packets changes. When the send rate is higher than the available bandwidth, the network needs to delay transmitting packets; the change corresponds to managing queues with delays being introduced that are due to these queues.

The curve of accumulated delays as a function of packet number n may be approximated by a first relationship so long as the send rate is less than the available bandwidth, and then by a second relationship after delays start being introduced as a result of the queues, the send rate becoming greater than the available bandwidth. The switchover from one relationship to another determines a breakpoint, which thus corresponds to the moment when the send rate becomes equal to the available bandwidth. Searching for a breakpoint thus makes it possible to obtain an estimate of the available bandwidth.

Unlike conventional iterative active methods of estimation (known as "iterative active probing"), of which the best known are train of packet pairs (TOPP), self-loading periodic streams (SLoPS), also known as Pathload, and finally PathChirp, all of which wait for information to be returned by the receiver in order to adapt the send rate of probe packets, the present "LIFBE" method uses only a single train having a small number of specific IP/UDP packets, known as "probes", that are sent at a certain send rate that is determined before sending the train. An exemplary embodiment of the present invention is not iterative since it does not require successive go-and-return operations between the receiver and the sender in order to converge on and discover the send rate that corresponds to the available bandwidth. In an exemplary embodiment of the invention, the estimate for the bandwidth is obtained directly after sending a single train of packets.

Sending a single train comprising a small number of UDP packets, about 20 to 50 packets, makes it possible with an exemplary embodiment of the invention to estimate the available bandwidth $A_b$ between a sender and a destination that are connected by a telecommunications network that may include a radio segment over a portion of the path, while minimizing occupation of the bandwidth. Given the small size of the packet train and given that only one train is sent, an exemplary embodiment of the invention enables bandwidth to be estimated fast and unobtrusively, and it is suitable for any type of wired or wireless network.

The accuracy of the estimate that is obtained makes it possible to manage QoS, which is not possible when the estimated value is erroneous. An underestimate leads to a loss of effectiveness, with a reduced maximum rate made available to a user, while an overestimate increases the risk of congestion. Furthermore, an erroneous estimated value can lead to a poor decision concerning selection of an access network or concerning offloading.

The method is dynamic and thus well adapted to variations in the load on the link between the sender and the destination, where such variations can occur more particularly when the sender and/or the destination are mobile, or as a result of changes in propagation conditions associated with the radio segment.

The available bandwidth may be estimated periodically or regularly as a function of parameters.

By regularly measuring the available bandwidth in real time, a method of an exemplary embodiment of the invention makes it possible to optimize the utilization of the resource. Thus, the method of an exemplary embodiment of the invention makes it possible to avoid loss of packets by allocating bandwidth in optimal manner, as close as possible to the real capacity of the link. The capacity of the link is determined by the segment having the smallest capacity, which generally corresponds to the radio segment. Even if the capacity of the radio segment decreases, the method of the an exemplary embodiment of makes it possible to make adjustments upstream to the way in which the available bandwidth is allocated, before any packets have been lost. This dynamic nature makes it possible to combat saturation situations by adapting bandwidth allocation to the bandwidth that is genuinely available, or even to anticipate blocking situations. This method is thus particularly suitable for a telecommunications system in which a node is moving, e.g. because it is installed on board transport means, where such movement leads to modifications to the capacity of the radio segment and thus to the available bandwidth of the link.

In an implementation of the method, the send rate is constant and the regression model is linear.

In an implementation of the method, the method further comprises:

a step of determining the effective capacity by means of a scan of the radio segment or by means of obtaining information associated with QoS.

In an implementation, the node linked by the radio segment (which may be the destination or the sender) scans the radio channel that corresponds to the radio segment. While scanning, the node can recover certain parameters including the maximum transmission rate possible for a given modulation and coding scheme (MCS). This maximum rate corresponds to the capacity of the segment at a given instant. This capacity, written $C_{L2}$, is associated with a level 2 (MAC layer). A corresponding value, written $C_{L3}$, may be determined for a level 3 (IP layer) with the level 2 capacity, $C_{L2}$, being weighted by the space necessary for the signaling used in layer 2, written $H_{L2}$, relating to the size of a packet at level 3, written $L_{L3}$. The corresponding value may be obtained using the following formula:

$$C_{L3} = C_{L2} \frac{1}{1 + \frac{H_{L2}}{L_{L3}}}$$

In an implementation that corresponds to the situation in which it is the destination node that is linked by the radio segment to the heterogeneous network, the destination node sends the level 3 capacity value $C_{L3}$ to the send node during an initiation stage that is performed in transmission control protocol (TCP). The information is thus typically sent using the TCP protocol prior to sending UDP probe packets.

Knowing the level 3 capacity, $C_{L3}$, the send node can determine a send rate for the packet train that is higher than said capacity.

In an implementation that corresponds to the situation in which the sender or the receiver is a mobile terminal, the send rate is constant and set to be greater than or equal to a parameter that can be obtained by means of a command such as the AT+CGEQNEG command specified in the context of the 3GPP TS 27.007 standard. The response message to this AT command includes a field that corresponds to the maximum rate (in kbit/s) for the downlink and a field corresponding to the maximum rate (in kbit/s) for the uplink (maximum bit rate MBR DL/UL).

In alternative manner or in addition, the effective capacity may be determined by obtaining information associated with QoS. When two values are available (radio and QoS), the value for the total effective capacity Ce is the smaller of the two values.

In an implementation of the method, the send rate is variable, the regression model is non-linear, and the utilization step comprises searching for a breakpoint corresponding to a change in the regression model, on the basis of the determined accumulated reception delay values and on the basis of the atypical jitter values.

In this implementation, the send rate varies as a function of time, increasing in compliance with the model selected by the sender (e.g. in linear manner), and at a given instant its value becomes equal to the available bandwidth. At that instant, the way the network transmits packets changes. When the send rate is higher than the available bandwidth, the network needs to delay transmitting packets; the change corresponds to managing queues with delays being introduced that are due to these queues. The curve of accumulated delays as a function of packet number n may be approximated by a first relationship so long as the send rate is less than the available bandwidth, and then by a second relationship after delays start being introduced as a result of the queues, the send rate becoming greater than the available bandwidth. The switchover from one relationship to another determines a breakpoint, which thus corresponds to the moment when the send rate becomes equal to the available bandwidth. Searching for a breakpoint thus makes it possible to obtain an estimate of the available bandwidth.

This implementation may advantageously be used in the absence of knowledge of the effective capacity. Nevertheless, the settings must be such that the send rate exceeds the available bandwidth during the transmission of the N packets. This condition can be guaranteed by an appropriate configuration of the transmission model (e.g. linear), of the variation step size (for linear transmission, the step size is such that $Sendrate_n = n*Stepsize$) and of the number N of packets sent (with linear transmission the send rate $Sendrate_N = N*Stepsize$ must necessarily be higher than the available bandwidth).

The breakpoint(s) may be determined by means of the median function and an iterative regression method. The best known iterative regression methods are the Gauss-Newton method and the Levenberg-Marquardt algorithm (LMA).

For example, with the LMA iterative regression algorithm, the breakpoint mentioned as the first parameter p0 to be found by the algorithm is also a function of the available bandwidth $A_b$. Thus, when packet n reaches the breakpoint p0, the variable send rate matches the available bandwidth $A_b$:

$$Sendrate_{n=p0} = \frac{L}{t^i_{p0+1} - t^i_{p0}} = Ab$$

The complete regression model for use by an iterative regression algorithm such as LMA then becomes:

$$T_{(n-1)} = t^i_{median(2,n,p0)} + \left(\frac{L}{p1}\right) * (median(p0, n-1, N) - p0) + \left(1 - \frac{L}{p1 * (t^i_{p0+1} - t^i_{p0})}\right) * (t^i_{median(p0,n,N)} - t^i_{p0}) + c$$

where the function median(X1,x,X2) is equal to x, if x lies in the range [X1,X2], is equal to X1 if x<X1, and is equal to X2 if x>X2, with the parameter p0 corresponding to the breakpoint, with the parameter p1 corresponding to Ce, with L corresponding to the fixed packet size, and with the parameter c corresponding to a constant that changes depending on the variation in the latency delays between packets n and 1:$D_n - D_1$. The number of parameters p0, p1, p2, ..., pM to be calculated by LMA regression depends on the number of changes of constant corresponding to the number of atypical jitter values that are identified. Thus, the constant c corresponds to a parameter p(j+2) starting from j=0, with p(j+2) corresponding to the constant $D_n - D_1$ for a segment [n1, n2] between two atypical values for variation in latency delay as previously identified.

An exemplary embodiment of the invention also provides a device for a telecommunications network, which device is adapted to perform the method of estimating the available bandwidth at the level of the IP layer from a single train of N IP/UDP packet frames generated at a variable send rate for a stream between a source node and the device, which are connected by a path made up of one or more links. The stream is transported by a telecommunications network that may include at least one radio segment over a portion of the path. The network may transport other IP streams belonging to the same class of service over all or a portion of the path. The device comprises:

receive means for receiving a single train of N packet frames, a frame comprising: a field with the IP address of the send node, a field with the IP address of the destination node, a field associated with the send format of the frame, a packet of size L including a timestamp field referred to as the input transmitting time $t_n^i$, and a field with the number n of the packet corresponding to the number n of the frame in the train, for n=1 to N, reception of a frame n triggering the packet n being associated with a timestamp value referred to as the output receiving time $t_n^o$);

determination means for determining values of accumulated reception delays starting from the second received packet and on reception of the packet n, with n=2 to N:

$$T_{(n-1)}=t_n^o-t_1^o$$

identification means for identifying atypical jitter values, between the transmission delays of successive packets:

$$\text{Jitter}_{(n-1)}=(t_{n+1}^o-t_{n+1}^i)-(t_n^o-t_n^i)$$

utilization means for using a non-linear regression model comprising searching for a breakpoint corresponding to a change of model on the basis of the determined accumulated reception delay values and the atypical jitter values.

An exemplary embodiment of the invention also provides a telecommunications system for implementing a method of estimating the available bandwidth at the level of the IP layer from a single train of N IP/UDP packet frames generated at a variable send rate for a stream between a source node and a destination node connected by a path made up of one or more links of an exemplary embodiment of the invention. The system comprises:

a source node and a destination node connected by a path that may include at least one radio segment;
a stream transport link between the source node and the destination node that may include at least one radio segment, wherein the destination node comprises:
receive means for receiving a single train of N packet frames, a frame comprising: a field with the IP address of the send node, a field with the IP address of the destination node, a field associated with the send format of the frame, a packet of size L including a timestamp field referred to as the input transmitting time $t_n^i$, and a field with the number n of the packet corresponding to the number n of the frame in the train, reception of a frame n triggering the packet n being associated with a timestamp value referred to as the output receiving time $t_n^o$);
determination means for determining values of accumulated reception delays on reception of the respective packets n and starting from the second received packet, with n=2 to N:

$$T_{(n-1)}=t_n^o-t_1^o$$

identification means for identifying atypical jitter values, between the transmission delays of successive packets:

$$\text{Jitter}_{(n-1)}=(t_{n+1}^o-t_{n+1}^i)-(t_n^o-t_n^i)$$

utilization means for using a non-linear regression model including searching for a breakpoint corresponding to a change of model on the basis of the determined accumulated reception delay values and the atypical jitter values.

In an implementation, the steps of a method for estimating the available bandwidth at the level of the IP layer for a stream between a send node and a destination node connected by a path made up of one or more links are determined by program instructions in the form of one or more modules incorporated in respective electronic circuits such as integrated circuits, which themselves may be located in an electronic device such as a node. The method of an exemplary embodiment of the invention for estimating the available bandwidth may also be performed when the program (or its modules) is loaded into a calculation member such as a processor or the equivalent with its operation then being controlled by execution of the program.

Consequently, an exemplary embodiment of the invention also applies to a computer program (or its various modules), in particular a computer program on or in a data medium, and adapted to perform an exemplary embodiment of the invention. The program may use any programming language, and be in the form of source code, object code, or code intermediate between source code and object code such as in a partially compiled form, or in any other desirable form for implementing a method of an exemplary embodiment of the invention.

The data medium may be any entity or device that is capable of storing the program. For example, the medium may comprise storage means such as a read only memory (ROM), e.g. a compact disk (CD) ROM, or a microelectronic circuit ROM, or indeed magnetic recording means, such as a universal serial bus (USB) key or a hard disk.

Alternatively, the data medium may be an integrated circuit in which the program is incorporated, the circuit being adapted to execute or to be used in the execution of the method in question.

Furthermore, the program may be converted into a transmissible form such as an electrical or optical signal, which may be conveyed via an electrical or optical cable, by radio, or by other means. The program of an exemplary embodiment of the invention may in particular be downloaded from an Internet type network.

An exemplary embodiment of the invention thus also provides a computer program on a data medium, the program including program instructions adapted to performing a method of an exemplary embodiment of the invention when said program is loaded in and executed by a node in telecommunications system.

An exemplary embodiment of the invention also provides a data medium including program instructions adapted to performing a method of an exemplary embodiment of the invention when said program is loaded in and executed by a node of a telecommunications system.

LIST OF FIGURES

Other characteristics and advantages appear from the following description made with reference to the accompanying figures given as non-limiting examples.

FIG. 1 is a diagram of an implementation of the invention in a network having three IP hops that are established between two nodes, and corresponding to a conventional configuration for a wired network using the OSI reference model of protocol layers and showing the various layers, when the two nodes are fixed terminals.

FIG. 2 is a diagram of an implementation of the invention in a network having two IP hops that are established between two nodes, and corresponding to a conventional configuration of a heterogeneous network comprising a universal mobile telecommunications system (UMTS) mobile network in the OSI reference model of protocol layers, and showing the various layers when one of the two nodes is a mobile terminal.

FIG. 3 is a diagram of an implementation of the invention in a network having three IP hops that are established between two nodes, and corresponding to a conventional configuration of a heterogeneous network having QoS domains managed by an internet protocol and multiprotocol label switching (IP/MPLS) tunnel mechanism in application of the OSI reference model of protocol layers and showing the various layers, when the two nodes are fixed pieces of equipment in the transport network.

DESCRIPTION OF EMBODIMENTS OF THE INVENTION

Figure 1:
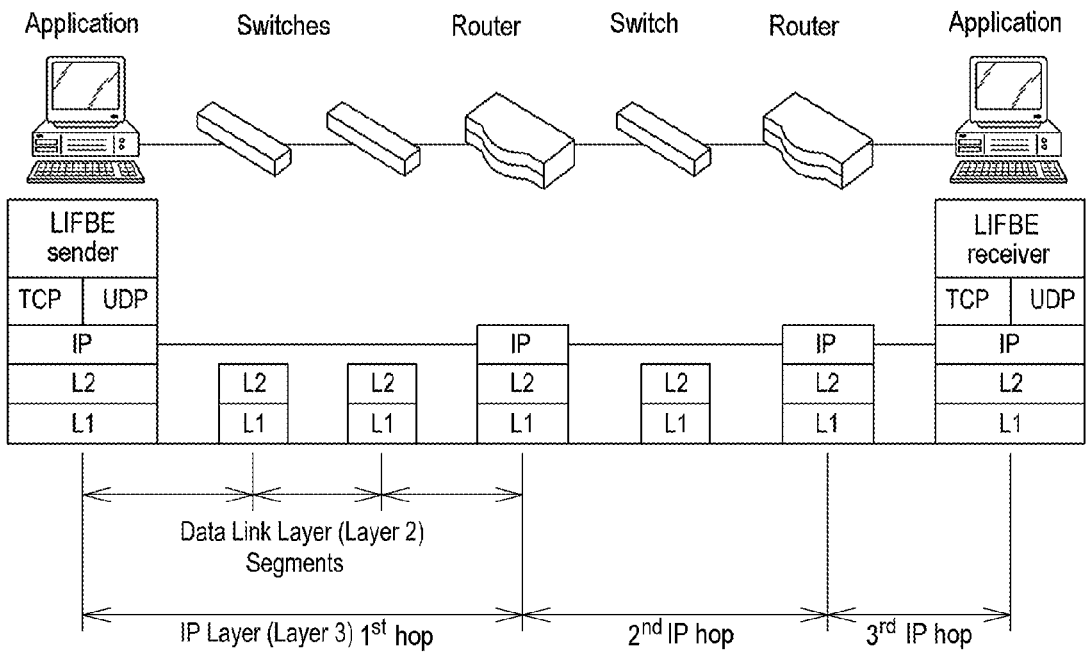
Figure 2:
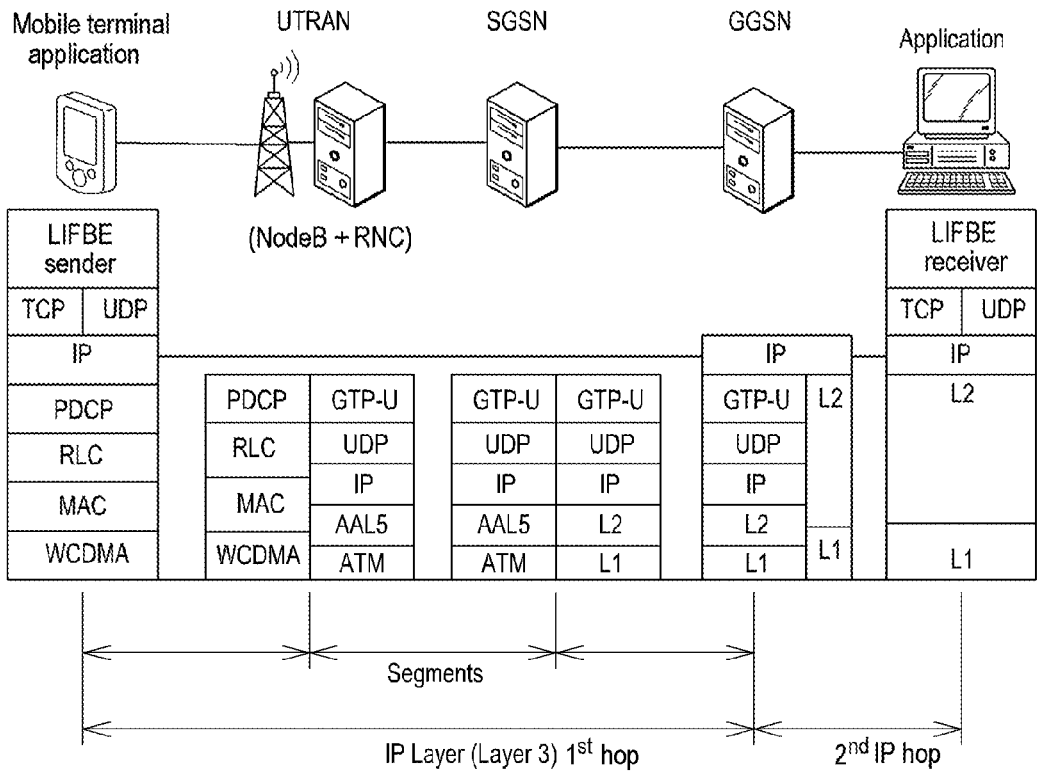
Figure 3:
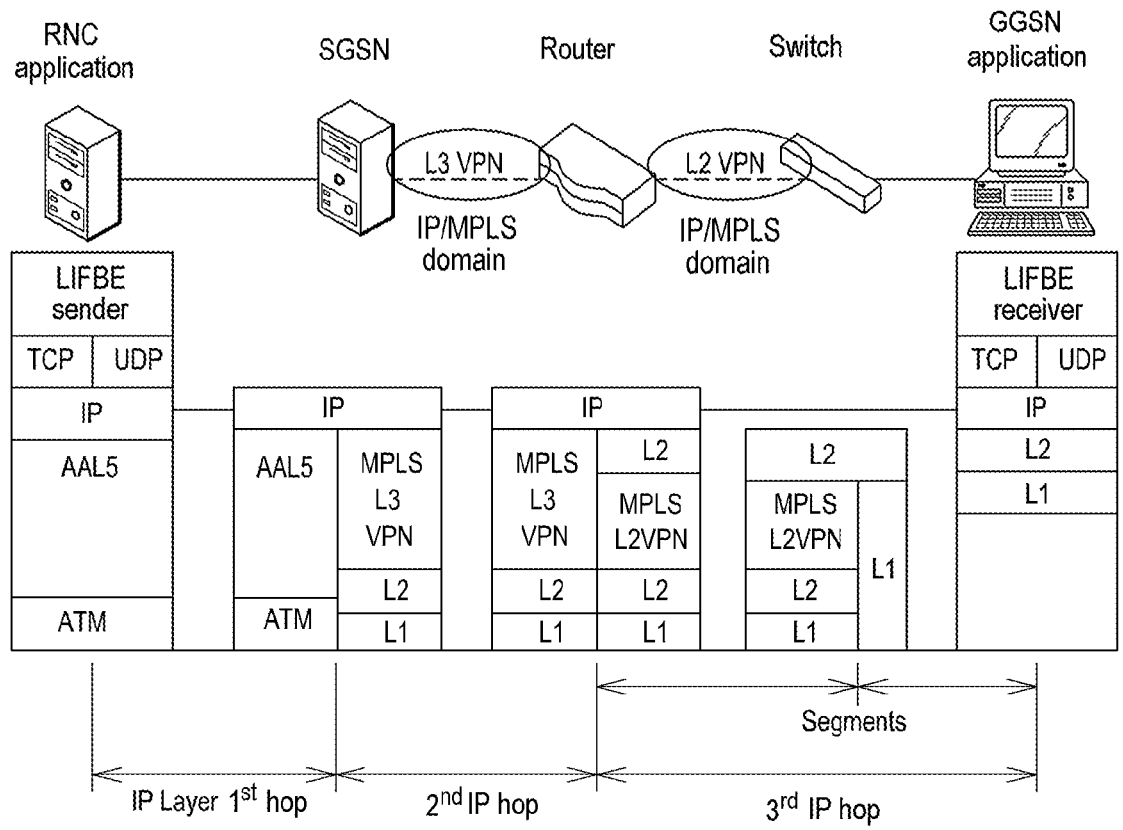

The method of an exemplary embodiment of the invention for estimating available bandwidth takes place at the level of the IP layer. The available bandwidth is estimated for a stream between a send node and a destination node that are connected by a path made up of one or more links of a telecommunications network. The network can transport other, competing IP streams over the entire path or over a portion only thereof. In the various calculations, the method takes account solely of the IP streams belonging to a given class of service or belonging to a higher class. In particular, a node of the network sends the packets of these various streams under consideration (with this commonly being performed by the IP router function) and, if necessary, it delays the sending of the packets. The delay is provided by means of a single first-in-first-out (FIFO) type queue if the network does not manage QoS or with a queue for each class of service if QoS is managed. Under such circumstances, various possibilities for ordering exist in order to give priority among queues of different classes. Generally, after prioritizing, the queues of the various classes always share a global queue that is also of FIFO type. Given that the streams relate to applications that might require data to be exchanged both in an uplink direction and in a downlink direction, a node may be both a send mode and a destination mode either simultaneously or in alternation.

Consequently, the method may be implemented equally well in the uplink direction and/or in the downlink direction.

These streams are transported by the telecommunications network which may include at least one radio segment over a portion of the path. Streams coming another send node or sent to another destination node may be transported over the same radio segment.

During an initialization stage, the sender and destination nodes initiate a session by each of them creating a TCP socket and a UDP socket by allocating an input/output port. The sender connects with the destination by setting up a TCP connection in client/server mode. The TCP server is either the sender or the destination. The sender informs the destination of the number N of IP/UDP frames, also referred to as probes, that it is going to send to it during the following stage.

During this TCP connection stage, the destination informs the sender of its suitability for obtaining information about the effective capacity Ce, either by means of a radio scan, or by means of QoS information associated with the maximum authorized sending data rate. Depending on its suitability, the destination sends the value of the effective capacity Ce to the sender or it sends a value that is zero or negative.

Optionally, the sender may use TCP to send its reference time to the destination (specifically its "NTP reference time" of the IETF standard RFC 5905 (network time protocol version 4)) to enable the destination to synchronize on this reference the values of the timestamp that it gives to the received packets of probes. This mode advantageously serves to avoid drift between the clocks at the sender and at the destination, also known as the "clock skew problem".

If the sender is itself suitable for obtaining information about the effective capacity Ce (by a radio scan or by QoS information), it compares this value with the value sent by the destination during the TCP connection stage. The final Ce value that is selected is the smallest of the various values. If the destination node sends a zero or negative value, indicating that it does not possess Ce information, then the sender takes as the final value for Ce the value that it has previously obtained by its own means. Under all circumstances, the sender uses TCP to send the final value for the effective capacity Ce to the destination.

At the end of this TCP initialization, the destination is ready to receive probes.

The transmission time of a packet n transmitted over a wired network having H IP hops may be evaluated by means of the OWD metric, which is generally expressed in the following form:

$$OWD_n = t_n^o - t_n^i \quad (1)$$

$$= \sum_{h=1}^{H} \left( D^h + q_n^h + \frac{L_n}{C^h} \right)$$

In a heterogeneous network including a wired portion and a wireless portion, which may for example correspond to a single radio segment or to a mesh network, the transmission time for a packet between two IP nodes in the send direction as evaluated by using the OWD metric may be expressed in the following form:

$$t_n^o - t_n^i = OWD_n(\text{wired}) + OWD_n(\text{wireless}) \quad (2)$$

$$= \sum_{h=1}^{Hw} \left( D^h + q_n^h + \frac{L_n}{C^h} \right) + \sum_{h=Hw}^{H} \left( D_n^h + q_n^h + \frac{L_n}{C_n^h} \right)$$

with:
- $t^o$ output receiving time;
- $t^i$ input transmitting time;
- n packet number;
- h hop number;
- Hw number of hops on the wired portion;
- H-Hw number of hops on the wireless portion;
- D latency delay depending on hop h signal propagation;
- q queuing delay depending on IP cross traffic on hop h;
- L/C transmission delay;
- L packet size;
- C capacity of hop h.

In a wired network, the capacity C and the latency delay D of a hop h are generally constant over time. They therefore do not depend on the packet number n, whereas for a wireless network, the capacity C depends on the modulation and coding scheme (MCS) which may be BPSK, QPSK, 16QAM, . . . , CRC, . . . , and which is usually associated with radio conditions (signal strength and signal-to-interference-plus-noise ratio (SINR)). Furthermore, the latency delay D may vary as a function of variations in propagation times and as a function of retransmission of frames taking place at the levels of the low layers (PHY/MAC).

Figure 6:
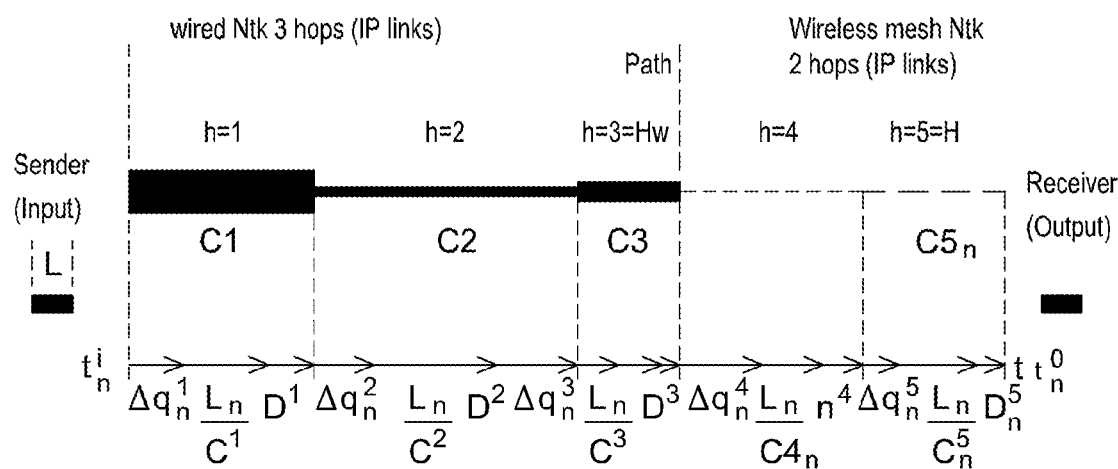
FIG. 6 is a diagram showing the one-way delay (OWD) metric for a link made up of five hops in which the first three hops correspond to three segments of a wired network and the following two hops correspond to a wireless network.

Equation (2) is shown in FIG. 6 for a link made up of five hops in which the first three hops correspond to three segments of a wired network and the following two hops correspond to two segments of a wireless network. By using equation (2) for the packets n and n+1, it becomes:

$$t_{n+1}^o - t_n^o = \quad (4)$$

$$t_{n+1}^i - t_n^i + \Delta q_n^{(total)} + D_{n+1}^{(wireless)} - D_n^{(wireless)} + \frac{L}{C_{n+1}^{(wireless)}} - \frac{L}{C_n^{(wireless)}}$$

To simplify, the capacity C and the latency D may be considered as varying in time only for the wireless portion in the above equation. Nevertheless, a network that is wired only may also present variations in capacity C and in latency D, e.g. in the event of retransmission over lower layers.

Consequently, below in this document, the variable term $D_n$ may thus relate equally well to a wireless portion or to a wired portion.

The send rate of the train of probes may be expressed in the following form when the size of the probe packets is fixed:

$$Sendrate_n = \frac{L}{t_{n+1}^i - t_n^i}$$

Assuming that there is a constant stream of cross traffic of the same class or of a higher class sharing the same FIFO type queue, the total waiting delay $\Delta q_n^{total}$ is directly proportional to the available bandwidth and to the transmission send rate generated by an additional stream. It is conventionally expressed in the following form when the send rate is greater than the available bandwidth $A_b$:

$$\Delta q_n^{total} = \frac{L}{C_e}\left(1 - \frac{A_b}{Sendrate_n}\right) \quad (5)$$

$$= \frac{L}{C_e}\left(1 - \frac{A_b}{L}(t_{n+1}^i - t_n^i)\right)$$

Since the waiting delay is always positive, if the send rate is less than or equal to $A_b$, then $\Delta q_n^{total}=0$. If the bandwidth is sufficient, there is no delay generated by a queue between packet n and packet n+1.

Figure 7:
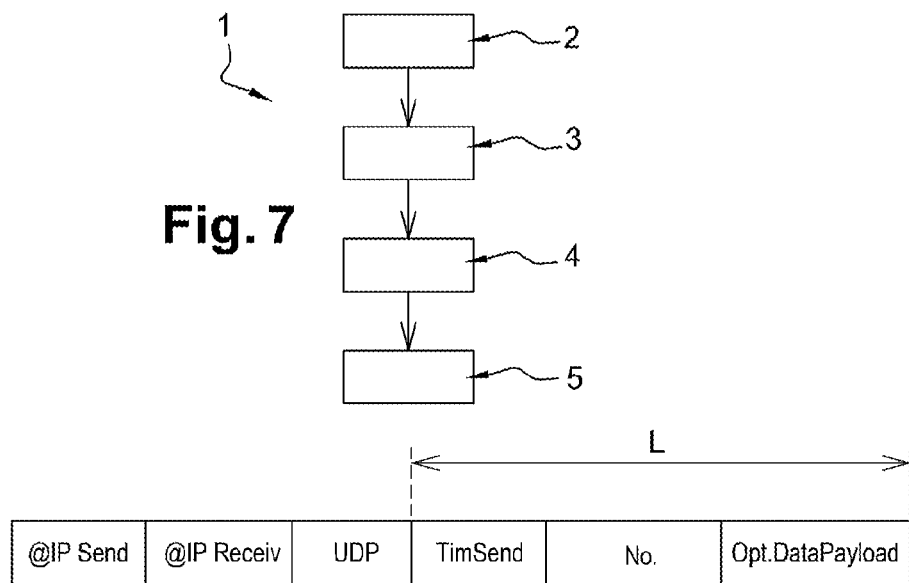
FIG. 7 is a flow chart showing the main steps of a method of estimating the bandwidth available in the IP layer for a stream between a send node and a destination node connected by a path made up of one or more links.

FIG. 7 is a flow chart showing the main steps of the method of estimating the available bandwidth at the level of the IP layer for a stream between a send node and a destination node.

The method 1 comprises a reception step 2 of the destination node receiving a single train of N frames of IP/UDP packets or probes, a determination step 3 of the destination node determining values for accumulated reception delays, an identification step 4 of the destination node identifying atypical jitter values between the transmission delays of successive packets, and a utilization step 5 of the destination node making use of a regression model.

Figure 8:
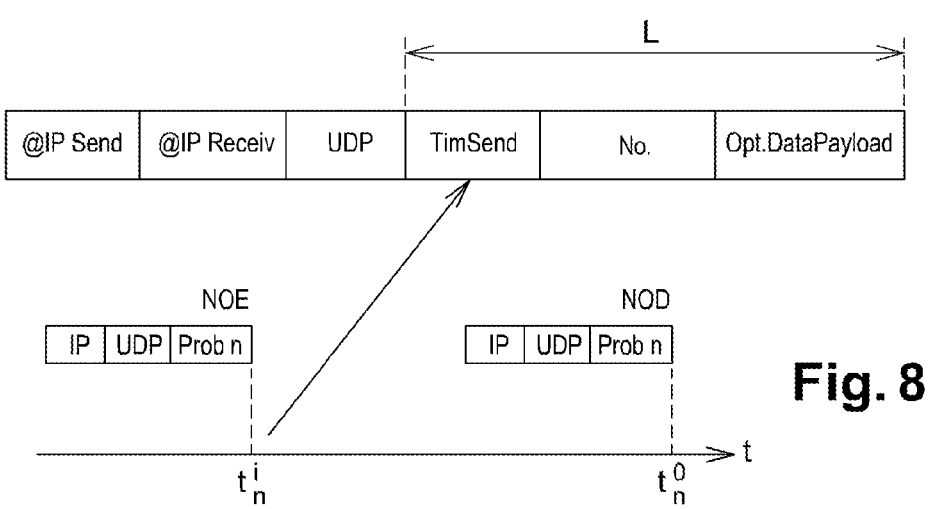
FIG. 8 is a diagram of an IP/UDP probe frame and of the timestamping performed firstly by the send node NOE and secondly by the destination node NOD.

The destination node receives, step 2, the single train of N frames of IP/UDP packets or probes sent at a certain send rate. A frame as shown in FIG. 8 comprises: a field with the IP address of the source node @ IP Send, a field with the IP address of the destination node @ IP Receive, a field associated with the send format of the UDP frame, a packet of size L including a timestamp field TimSend $t_n^i$, and a field No. with the number n of the packet corresponding to the number n of the frame in the train (with n varying from 1 to N), and also an optional field Opt.DataPayload that may contain for example padding data in order to reach the size MTU. The packet of size L referred to as a probe is thus encapsulated in a packet that is typically of UDP format and that is inserted in an IP frame. The TimSend field contains the transmission time as specified by the send node NOE when the IP frame is passed to the low layer, i.e. typically to the level 2 layer known as MAC. The destination node NOD receiving a frame n causes the packet n contained in the frame n to be associated with a timestamp value referred to as the reception time $t_n^o$.

The destination node determines, step 3, the accumulated values of the reception delays on receiving the packets. The accumulated values of the reception delays are calculated and stored starting from receive packet n=2 and until receive packet n=N.

The accumulated reception delay is then expressed by the relationship:

$$T_{(n-1)} = \sum_{k=1}^{k=n-1} (t_{k+1}^o - t_k^o) = t_n^o - t_1^o$$

The accumulated reception delays may be approximated by curve fitting using a regression model that takes account of an accumulated transmission delay. The model used for the regression is derived from equations (4) and (5). The curve for the accumulated reception delays is thus approximated starting from the second packet n=2 by the following relationship:

$$T_{(n-1)} = \left(\frac{L}{C_e}\right)*(n-1) + \frac{(C_e - A_b)}{C_e}*(t_n^i - t_1^i) + D_n - D_1 \quad (7)$$

with $A_b$ being the available bandwidth, $C_e$ being the effective capacity, and $D_n$ and $D_1$ being the variable propagation times respectively of packets n and n=1. Equation (7) is obtained from equations (4) and (5) by considering that the variable capacity $C_n$ of the segments is constant over the time window under consideration corresponding to transmission of the train of IP/UDP packets. Over this window, the modulation and coding scheme is thus considered as remaining unchanged. This is true for a train with a small number N of IP packets.

The term $D_n-D_1$ may be approximated by a constant when the latency delays $D_n$ are similar over the time interval under consideration. For example, between packet n=2 and packet n=8 the differences $D_n-D_1$ may be substantially equal. In contrast, the constant changes as soon as retransmission takes place in the low layers or as a result of any other significant additional delay between an IP packet n and the following IP packet n+1.

Step 4 of the destination node identifying atypical jitter values between the transmission delays of successive packets serves to identify points at which the constant changes. This identification may be performed by a method for identifying abnormal (atypical) points in jitter values, such as for example the "box plot" method.

The box plot method consists in beginning by sorting the data in increasing order so as subsequently to be able to determine the value of the first quartile (written Q1) and the value of the third quartile (written Q3). The method determines the second quartile that corresponds to the median, and then searches for the median of the first half of the data corresponding to the first quartile. The method then searches for the median of the second half of the data corresponding to the third quartile. The method then determines the difference between quartiles: E=Q3−Q1. Abnormal or atypical values are values that lie outside lower and upper fences identified as follows:

lower inner fence (LIF)=Q1−1.5\*E;
upper inner fence (UIF)=Q3+1.5\*E; and
the jitter values, $Jitter_n$, are defined for a packet n lying in the range n=2 to N by the following relationship:

$$Jitter_{(n-1)} = OWD_{n+1} - OWD_n$$
$$= (t_{n+1}^o - t_{n+1}^i) - (t_n^o - t_n^i)$$
$$= \Delta q_n^{total} + D_{n+1} - D_n$$

The waiting delays $\Delta q_n^{total}$ do not give rise to large amounts of variation, unlike the latency delays D which may vary suddenly as a result of retransmission. Thus, as soon as a jitter value becomes "abnormal" using the box plot method, the constant equal to the term $D_n-D_1$ changes.

This constant is then used for the regression in application of equation (7).

Thus, during step 4, observing jitter values by the box plot method makes it possible to determine the number of changes of constant and to identify the moments when the constant changes. For example, if the jitter value for n=6 is abnormal in application of the box plot method, then the constant used for regression with equation (7) changes as from n=6.

In step 5, the destination node uses a regression model applied to the accumulated reception delays as determined by equation (7). The regression or "curve fitting" serves to determine the coefficients of equation (7) that minimize the least squares error between points obtained by calculating the equation and the real values of the accumulated reception delays $T_{(n-1)}$.

Equation (7) can be simplified depending on whether the send rate is constant or variable.

In a first implementation, the send rate is constant and equation (7) can be expressed in the following form:

$$T_{(n-1)} = a*(n-1) + D_n - D_1 \quad (8)$$

where $$a = \frac{L}{C_e} \frac{(C_e + Sendrate - A_b)}{Sendrate}$$

Step 4 serves to determine the moment at which the constant $D_n-D_1$ changes.

Equation (8) thus characterizes a piecewise linear regression with straight line segment change points identified during step 4.

Thus, the various values for the slope a and for the constant can be determined by linear regression performed using the least squares method on straight line segments each defined by two breakpoints (i.e. when the constant changes). For example, if atypical jitter values are identified at n=9 and at n=19, then a linear regression is performed over the range n=2 to n=8, over the range n=9 to n=18, and finally over the range n=19 to N. Each straight line segment corresponds to a slope of value a and to a constant obtained by linear regression. The value a for taking into consideration during the final calculation may be weighted and averaged between the various values for a that correspond to the different line segments.

In this embodiment, the send rate is constant and the information about effective capacity Ce is known beforehand. $A_b$ can be deduced from the coefficient a for the slope of the line (possibly weighted and averaged in accordance with the latest line segments):

$$A_b = C_e\left(1 - \frac{a}{L}Sendrate\right) + Sendrate$$

In a second embodiment, the send rate is variable and exceeds the available bandwidth at a given moment while sending the N packets making up the train. The regression can be solved by an iterative method such as the Levenberg-Marquardt algorithm (LMA) [Ref2]. The Levenberg-Marquardt algorithm serves to obtain a numerical solution to the problem of minimizing a function that is not necessarily non-linear and that depends on a plurality of variables. The algorithm interpolates the Gauss-Newton algorithm and the gradient algorithm. The main application of LMA is generally regression using the least squares method: given a certain number of data pairs ($t_i$, $y_i$), the method searches for the parameter a of the function f(t|a) such that the sum of the squares of the departures is minimized:

$$S(a) = \sum_{i=1}^{m} [y_i - f(t_i \mid a)]^2$$

If the send rate is too low and does not exceed $A_b$ then the waiting time $\Delta q_n^{total}$ expressed using equation (5) is zero and the expression for accumulated reception delay $T_{(n-1)}$ becomes:

$$T_{(n-1)} = (t_n^i - t_1^i) + D_n - D_1 \qquad (9)$$

When the send rate is variable, the method determines a breakpoint that corresponds to a change of model between equation (9) and equation (7). The breakpoint mentioned as being the first parameter p0 to be determined by the LMA iterative regression algorithm is also a function of the available bandwidth $A_b$. Thus, when the packet n reaches the breakpoint p0, the variable send rate corresponds to the available bandwidth $A_b$:

$$\text{Sendrate}_{n=p0} = \frac{L}{t_{p0+1}^i - t_{p0}^i} = A_b$$

The complete regression model for use by an iterative regression algorithm such as LMA then becomes:

$$T_{(n-1)} = t_{median(2,n,p0)}^i + \left(\frac{L}{p1}\right) * (\text{median}(p0, n-1, N) - p0) +$$
$$\left(1 - \frac{L}{p1 * (t_{p0+1}^i - t_{p0}^i)}\right) * (t_{median(p0,n,N)} - t_{p0}^i) + c$$

where the function median(X1,x,X2) is equal to x, if x lies in the range [X1,X2], is equal to X1 if x<X1, and is equal to X2 if x>X2, where p0 is the parameter corresponding to the breakpoint, where p1 is the parameter corresponding to Ce, where L is the fixed size of the packet, and where c is the constant that changes depending on the difference $D_n - D_1$.

The number of parameters p0, p1, p2, ..., pM to be calculated by LMA regression depends on the number of changes of constant identified during step 4. Thus, the constant c corresponds to a parameter p(j+2) starting from j=0, with p(j+2) corresponding to the constant $D_n - D_1$ for the range [n1, n2] between two atypical jitter values for packet n1 and packet n2 as identified in step 4.

Thus, determining optimum parameters by LMA regression serves to determine the effective capacity Ce=p1 and the available bandwidth $A_b$:

$$\text{Sendrate}_{n=p0} = \frac{L}{t_{p0+1}^i - t_{p0}^i} = A_b$$

Figure 9:
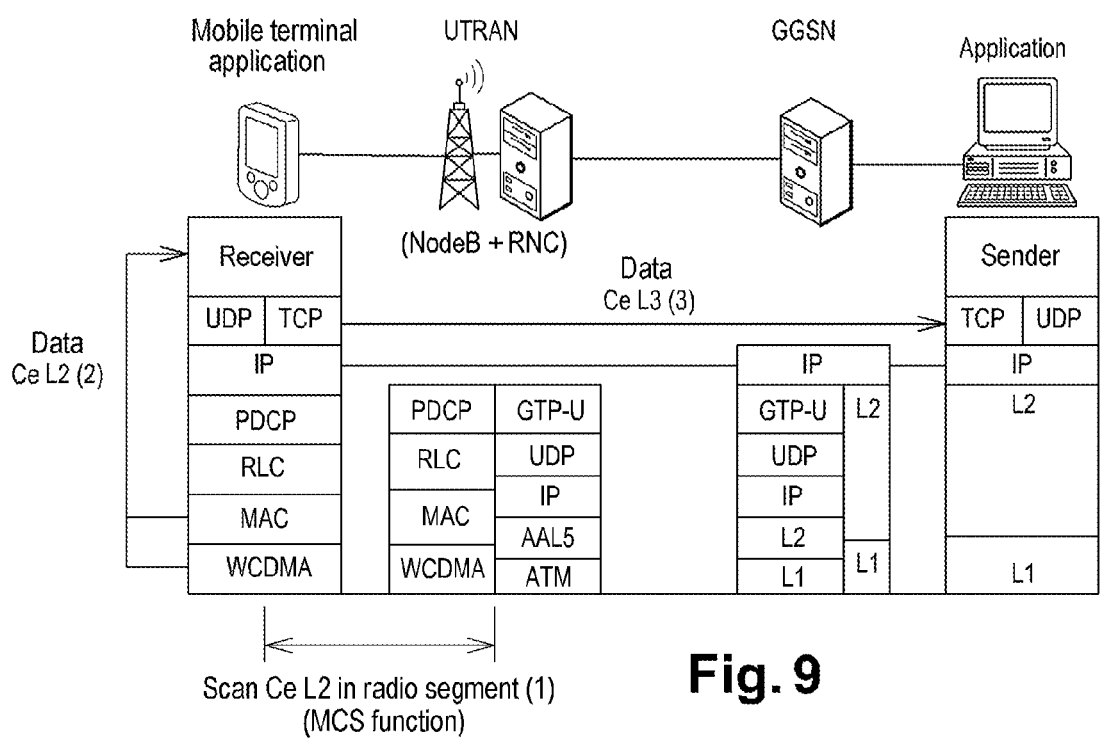
FIG. 9 is a diagram showing a first embodiment of a first implementation of the invention in which the receiver node is situated in the wireless network and in which the value of the effective capacity is obtained by a radio scan.

In a particular embodiment of the first implementation shown in FIG. 9, the method 1 further comprises:

a step of determining the effective capacity by means of a scan of the radio segment.

This mode is particularly suitable for the situation in which one of the sender and destination nodes is mobile and the radio link is considered as being the link of lowest capacity. The mobile node is thus connected over a "radio" wireless link. This node can find the maximum possible transmission rate over the physical layer by means of a scan of its wireless environment. This rate may be taken to be the effective capacity for a given MCS.

This information may be static, e.g. because it corresponds to a physical maximum. Nevertheless, obtaining it by a radio scan depends on the manufacturer giving authorization to access this information. For example, a high speed downlink packet access (HSDPA) type terminal of category 10 may transport a maximum of 10 HS-DSCH codes with 16-QAM modulation, giving rise to a theoretical maximum transmission rate of 7.2 Mbit/s in the physical layer.

The radio scan information may be dynamic, and thus more rigorous. Obtaining the transmission rate also depends on authorization to access this information and is performed using commands specific to the manufacturer and to the wireless technology used. For example, in an environment with WiFi type wireless transmission relating to one of the standards in the IEEE 802.11 family (802.11a/b/g . . . ), the node may obtain information about the maximum data rate possible over the WiFi link depending on the data rate used: 54 Mbit/s, 27 Mbit/s, . . . , 6 Mbit/s.

Thus, in this implementation, the send node sends a packet train at a constant data rate higher than the previously determined effective capacity. When the scan is not performed by the send node but by the destination node, the destination node informs the send node of the value obtained during the scan.

Figure 10:
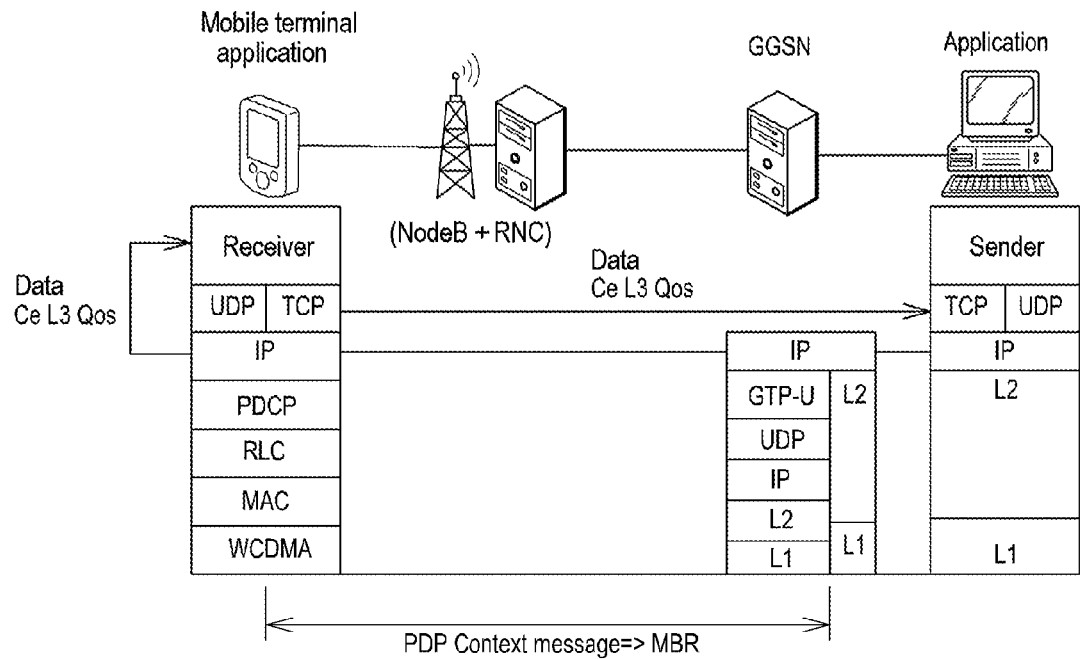
FIG. 10 is a diagram showing a second embodiment of the first implementation of the invention in which the receiver node is situated in the wireless network and in which the value of the effective capacity is obtained by means of an AT command in the context of QoS management.

In another particular embodiment of the first implementation shown in FIG. 10, the method 1 further comprises:

a step of determining the effective capacity by using quality of service information.

This implementation is particularly suitable for a heterogeneous network in which QoS is managed and for which the narrowest link is situated in the network managing QoS. The effective capacity may be considered as being the maximum bit rate (MBR) authorized by the network managing QoS. One of the nodes may obtain the value negotiated for the MBR and allocated by the network operator. For example, in a GSM or UMTS type cellular network, this MBR may be obtained by means of an AT command of the 3GPP standard TS 27.007. The command AT+CGEQNEG makes it possible to obtain the authorized MBR (in kbit/s), which is included in the "activate PDP context accept" message.

In this implementation, the send node sends the train of packets at a constant rate higher than the previously determined effective capacity. When the QoS information is not directly accessible for the send node, the destination node sends the value obtained for QoS to the send node.

If it is not possible to obtain the effective capacity, whether by a radio scan or by QoS information, then the send rate for the train of N IP/UDP packets is variable, e.g. being varied in linear manner.

In contrast, if the effective capacity information is accessible by at least one of the send and destination nodes, the send rate for the train of N IP/UDP packets may be constant, assuming that the information about this effective capacity is reliable. When a plurality of values are available for the effective capacity Ce, it is the lowest value for Ce that is selected by the send node. When the lowest capacity is determined by the send node, the information about capacity Ce is communicated in TCP to the destination before sending IP/UDP packets.

The destination can determine the send rate by extracting the transmission time from the receive probes: $(t_n^i - t_1^i)$.

The method is dynamic since the determined available bandwidth is updated either periodically or on being triggered. If the available bandwidth becomes smaller because of a change to the utilization of the radio channel, the estimated available bandwidth may decrease. Only one single train of N probe frames is needed for each determination of available bandwidth.

In one embodiment, between two successive occasions on which the method is performed, detecting a particular event (e.g. an end node changing cell) causes an alert message to be generated that serves to trigger a new estimation of the available bandwidth. After triggering in this way, estimations may continue to be repeated at the same periodicity.

Figure 11:
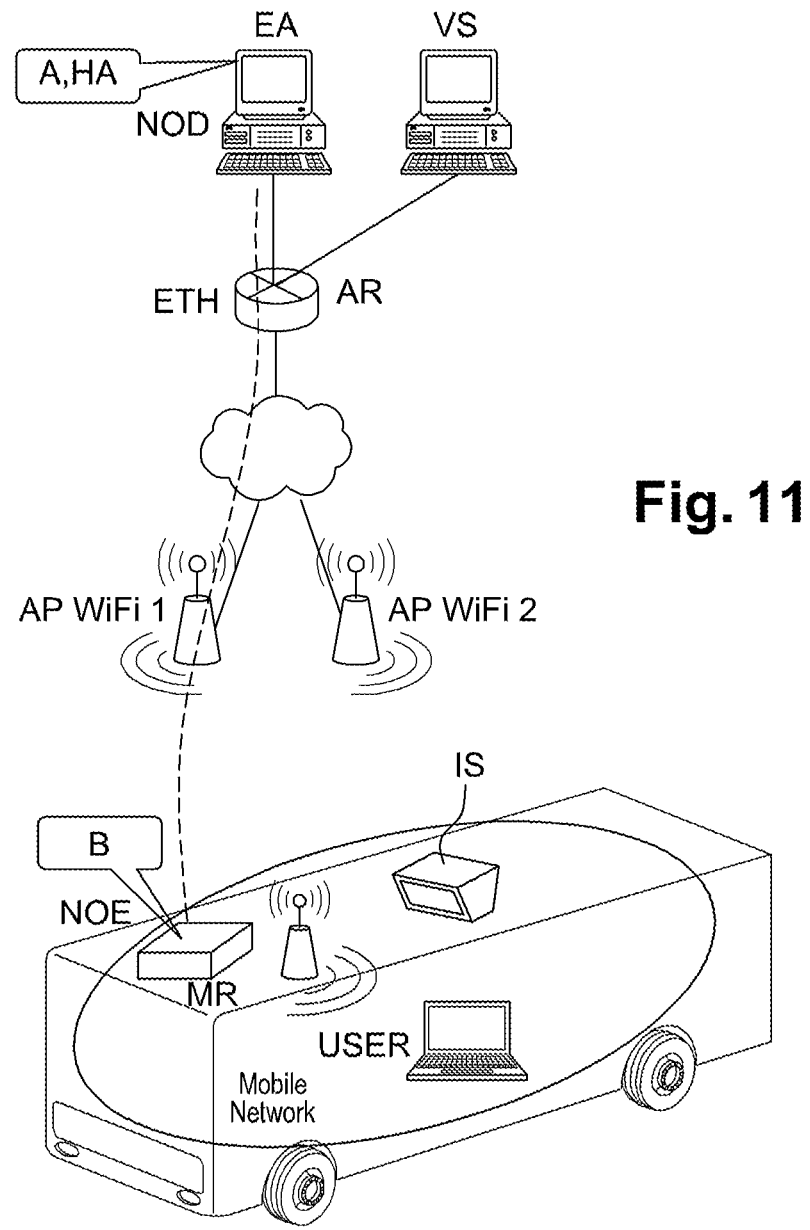
FIG. 11 is a diagram of an example implementation of the invention in the context of a mobile router MR installed on board a bus for routing communications between a passenger and a remote entity.

FIG. 11 is a diagram showing an implementation of the invention in the context of a mobile router MR installed in a bus for routing communications between a passenger USER and a remote entity VS.

The telecommunications system has an access point AP and the mobile router MR on board the bus, a plurality of access points AP1, AP2, . . . arranged along the path of the bus, an access router AR, network equipment EA connected to the access router AR, and a video server VS that is accessible via the access router AR.

The send node corresponds to the mobile router MR. The destination node corresponds to the network equipment EA in which a home agent (HA) is implemented in compliance with a standard for managing mobility using IP mechanisms, such as MobileIP (MIP). The home agent HA is continuously aware of the access network via which it is possible to reach the mobile router MR. The send node and the destination node are connected by a link that includes a radio segment between the mobile router and an access point arranged along its path. This link enables streams to be transported between the send node and the destination node. All traffic from and to the mobile router MR passes via the home agent HA. The mobile router MR is a piece of equipment installed in transport means (bus, high-speed train, etc.) that enables users, passengers on board, and professional applications associated with public transport, to access network services on the ground.

The method of an exemplary embodiment of the invention for estimating the available bandwidth is performed by executing two software modules B and A implemented respectively in the source node and the destination node, specifically in this example, in the mobile router MR and the network equipment. Since the available bandwidth that is being estimated relates to streams that are generally associated with both-way communications, each node is both a source node and a destination node either simultaneously or in alternation. The module A implemented with the home agent HA in the destination node serves to estimate the bandwidth available for traffic leaving the send node, i.e. the mobile router, and going to the network equipment for the uplink direction. Symmetrically, the module B implemented in the mobile router MR serves to estimate the bandwidth available for traffic in the opposite direction, i.e. in the downlink direction.

Each of the modules A and B can manage a FIFO queue to which traffic streams of a given class of service are directed, with this being done for example on the basis of characteristics defined by a classification architecture model such as the "differentiated services" model. This differentiated services network architecture model defines how to classify and control IP traffic to ensure QoS. This architecture is mainly described in two requests for comments (RFCs), namely RFC 2474 and RFC 2475 issued by the internet engineering task force (IETF).

By way of example, the queue receives VoIP or video or best effort or background traffic coming from various passengers.

When managing a queue, each module A, B includes a queue manager that extracts packets from the queue at a certain rate.

In order to make effective use of the link, given its capacity, which may fluctuate, the modules A and B estimate the bandwidth available over the link dynamically and in real time for streams going to the network equipment EA and for streams going to the mobile router, and they transmit packets at a rate that corresponds to the estimated available bandwidth.

Figure 4:
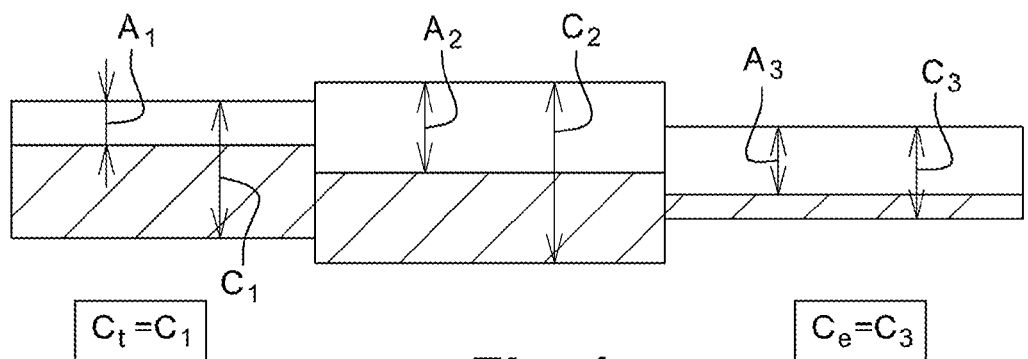
FIG. 4 is a diagram showing an example of a network having three IP hops of respective capacities $C_1$, $C_2$, and $C_3$, and of respective available bandwidths $A_1$, $A_2$, and $A_3$, with the first link being the tight link, i.e. $C_t=C_1$, and with the third link being the narrow link, i.e. $C_e=C_3$.
Figure 5:
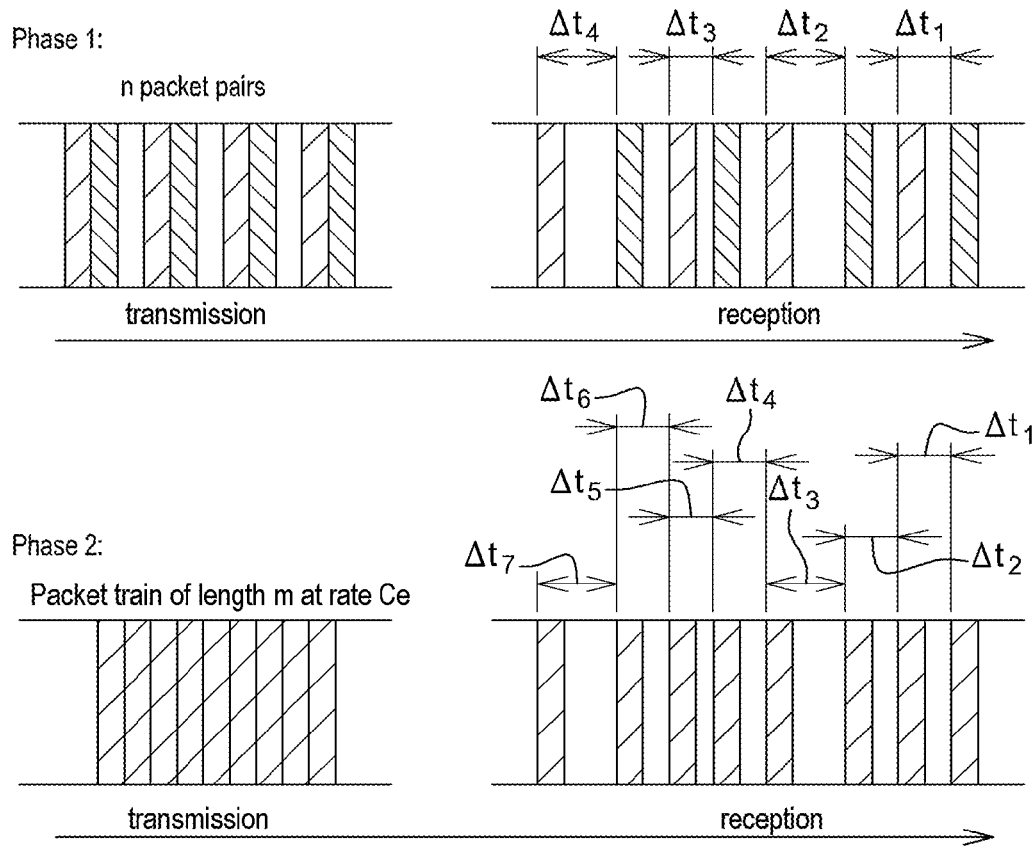
FIG. 5 is a diagram showing the two transmission stages of the prior art WBest tool.

The available bandwidth is estimated end-to-end, and it is equivalent to the bandwidth of the tight segment as shown in FIG. 4, which corresponds in the example shown in FIG. 11 to the WiFi radio segment between the mobile router MR and one of the access points AP1, AP2, . . . .

Each module A, B estimates the bandwidths available between the nodes EA and MR in the uplink and downlink directions by means of a method of an exemplary embodiment of the invention.

The algorithm for estimating the available bandwidth is run after opening a TCP connection between the end nods EA and MR.

Depending on the uplink or downlink direction, the send node EA or MR sends at a certain rate a signal made up of a single train of N probe frames.

In a first step, the destination node receives the single train of N probe frames. The destination node associates each receive frame n with a timestamp value referred to as the receiving time $t_n^o$ of the packet n in the frame n, for n=1 to N.

In a second step, the destination node determines for each received packet n starting from the second packet n=2, a value for the accumulated reception delay by calculating the expression:

$$T_{(n-1)} = (t_n^o - t_1^o)$$

In a third step, using the box plot method, the destination node identifies atypical jitter values, Jitter, defined by:

$$\text{Jitter}_{(n-1)} = (t_{n+1}^o - t_{n+1}^i) - (t_n^o - t_n^i)$$

thus making it possible to identify changes in the value of the constant $D_n - D_1$ for a given time interval.

In a fourth step, the destination node uses a regression model among the accumulated reception delays determined during the second step as a function of the accumulated transmission delay and equation (7).

By using a regression model, it is possible to determine the coefficients for equation (7) that minimize the least squares error between points determined by means of the equation (7) and the values of the accumulated reception delays for the same accumulated transmission delay.

Knowing the bandwidth available in the downlink direction, or in the uplink direction as the case may be, the manager of the queue adapts the send rate at the outlet from the node.

Figure 12:
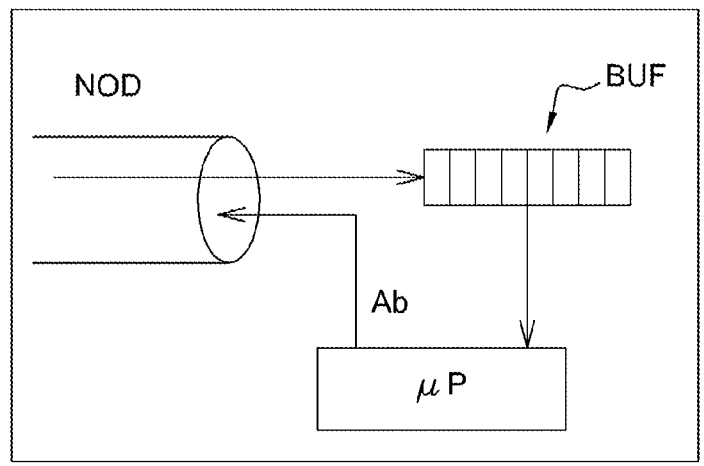
FIG. 12 is a diagram showing a simplified example of structure for a destination node in the invention.

FIG. 12 is a diagram of a simplified structure example for a destination node NOD suitable for estimating bandwidth in accordance with an exemplary embodiment of the invention and for use in a telecommunications network that includes at least one send node and at least one destination node. These nodes are connected by a link that includes at least one radio segment over a portion of the link.

In the implementation shown in FIG. 11, the destination node is either the mobile router MR, or the network equipment hosting the home agent HA, each acting in its destination node function.

The destination node NOD is adapted to comprise:
receive means (BUF) for receiving a single train of N IP/UDP packet frames known as probes that are sent at a certain send rate;
calculation means μP for calculating the bandwidth $A_b$ that is available for a stream between the source node and the destination node by calculating the accumulated reception delays dynamically and in real time on the basis of the receive packets of a train of IP/UDP packet frames sent by the source node; and
means μP for returning the estimated bandwidth value $A_b$ to the source node.

The receive means (BUF) for receiving a single train of N IP/UDP packet frames at a certain send rate is typically a memory space that may be a buffer, a random access memory (RAM), etc.

The means μP for estimating the available bandwidth are typically programmable means, e.g. a microprocessor that is micro-programmed for timestamping the received probes as sent by the source node, for calculating in real time the accumulated reception delays, for identifying atypical jitter values between the successive packet transmission delays, and for performing regression on the basis of the accumulated reception delays as a function of an accumulated transmission delay and knowing the atypical jitter values. The means μP for returning the available bandwidth value to the source node are typically the same programmable means as described above, but additionally micro-programmed specifically for returning the estimated available bandwidth value to the source node.

The destination node NOD is thus adapted to perform a method for estimating the available bandwidth.

Figure 13:
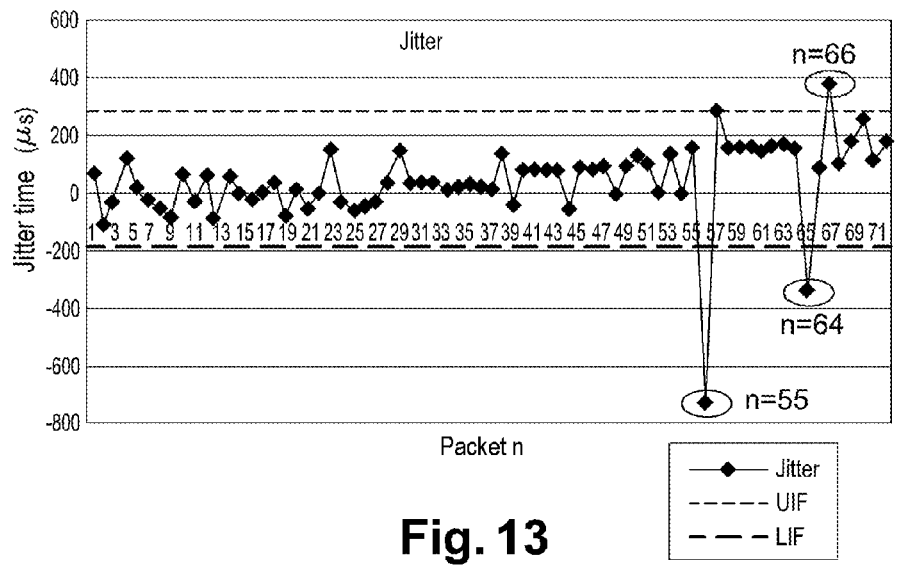
FIG. 13 shows values of jitter obtained while sending probes in accordance with an exemplary embodiment of the invention.

FIG. 13 shows jitter values obtained while sending probes in accordance with an exemplary embodiment of the invention. Using the box plot method, two thresholds are determined: a lower inner fence (LIF) and an upper inner fence (UIF). Three values outside these limits are identified as being atypical or abnormal in association with the values of their corresponding packet numbers.

Figure 14:
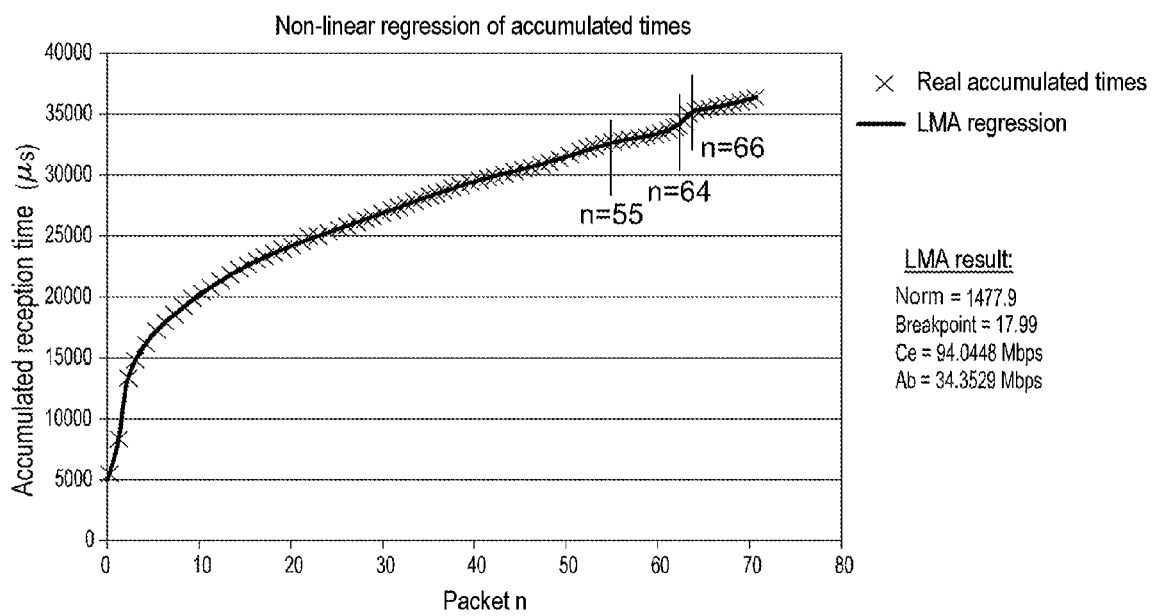
FIG. 14 is a graph plotting accumulated reception times after sending probes in accordance with an exemplary embodiment of the invention.

FIG. 14 shows the curve for accumulated reception times after sending probes in accordance with an exemplary embodiment of the invention and relating to the same example as that shown in FIG. 13. In this example, UDP type cross traffic is generated at a constant rate of 60 Mbit/s, and it shares a common wired link of the 100BASE-TX fast Ethernet type. The real measurements of the accumulated reception delays are interpolated by using non-linear LMA regression. The calculated coefficients minimizing the least squares error makes it possible to determine directly the effective capacity Ce and the breakpoint. The breakpoint makes it possible to determine the available bandwidth $A_b$ in application of the above description of an exemplary embodiment of the present invention. A change of constant occurs at the same packet numbers having atypical jitter values as previously identified and shown in FIG. 13.

Figure 15:
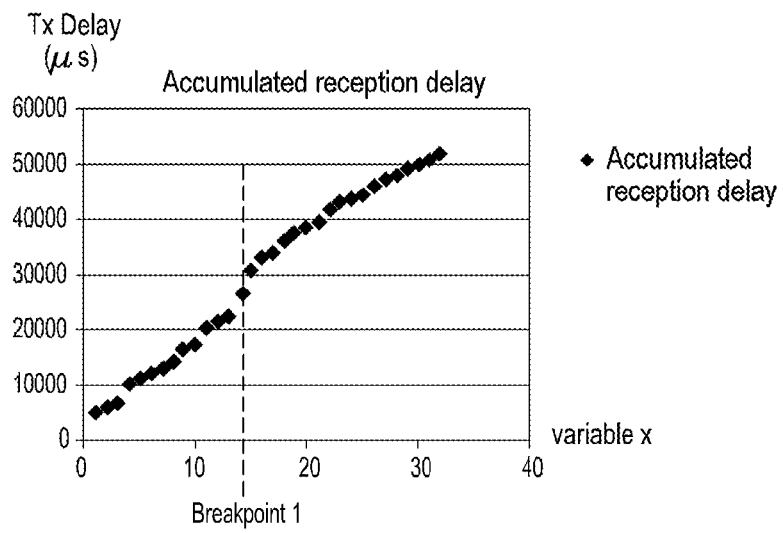
FIGS. 15 to 17 are similar graphs showing the results of real measurements of accumulated reception delays as a function of packet number.
Figure 16:
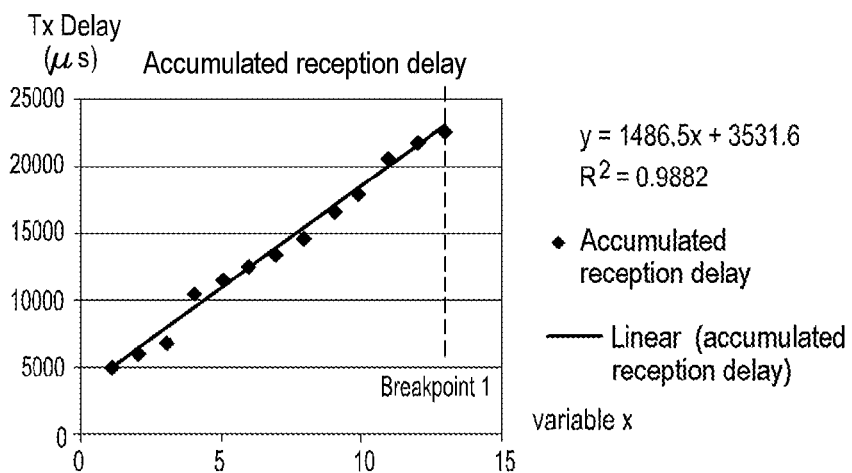
Figure 17:
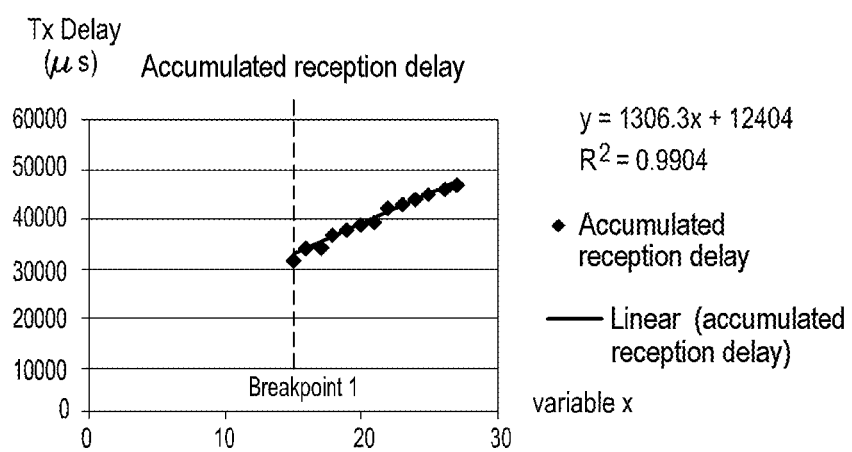

FIGS. 15 to 17 show the same curve for the results of real measurements of accumulated reception delays as a function of packet number n (x=n−1). The curve can be interpolated by piecewise linear regression with a change making it possible to determine the two line slope coefficients. The value for $A_b$ is calculated as in the above description, it being given that the capacity Ce must be known.

[Ref1]: M. Li, M. Claypool, and R. Kinicki. WBest: a bandwidth estimation tool for IEEE 802.11 wireless networks. In Proc. of IEEE LCN, 2008.

[Ref2]: K. Madsen, H. B. Nielsen, O. Tingleff. Methods for non-linear least squares problems (2004).

Although the present disclosure has been described with reference to one or more examples, workers skilled in the art will recognize that changes may be made in form and detail without departing from the scope of the disclosure and/or the appended claims.

The invention claimed is:

1. A method of estimating available bandwidth at a level of an Internet Protocol (IP) layer for a stream between a send node and a destination node that are connected by a path made up of one or more links, the stream being transported by a telecommunications network that may include at least one radio segment over a portion of the path, the network being capable of transporting other IP streams over all or a portion of the path, the estimation method making use of a single train of N IP/UDP packet frames generated at a certain send rate, and comprising:

a receive step of the destination node receiving the single train of N packet frames, a frame comprising: a field with the IP address of the send node, a field with the IP address of the destination node, a field associated with the send format of the frame, a packet of size L including a timestamp field referred to as the input transmitting time $t_n^i$, and a field with the number n of the packet corresponding to the number n of the frame in the train, for n=1 to N, reception of a frame n triggering the packet n being associated with a timestamp value referred to as the output receiving time $t_n^o$;

starting from the second received packet, a determination step of the destination node determining accumulated reception delay values on reception of the packet n, with n=2 to N:

$$T_{(n-1)} = t_n^o - t_1^o$$

an identification step of the destination node identifying atypical values of jitter, Jitter, between the transmission delays of successive packets, $$\text{Jitter}_{(n-1)} = (t_{n+1}^o - t_{n+1}^i) - (t_n^o - t_n^i)$$

a utilization step of the destination node using a regression model applied to the accumulated reception delays as a function of an accumulated transmission delay and taking account of the atypical jitter values.

2. The method according to claim 1, wherein said certain send rate generated by said send node is constant and said regression model used by said destination node is linear.

3. The method according to claim 2, the method further comprising:

a determination step of said destination node determining the effective capacity by using a scan of the radio segment or by obtaining information associated with QoS.

4. The method according to claim 1, wherein said certain send rate generated by said send node is variable and said regression model used by said destination node is non-linear, and wherein said utilization step of said destination node comprises searching for a breakpoint corresponding to a change in the regression model, on the basis of the determined accumulated reception delay values and on the basis of the atypical jitter values.

5. An apparatus comprising a device for a telecommunications network, which estimates available bandwidth $A_b$ at a level of an Internet Protocol (IP) layer for a stream between a send node and said device, said send node and said device being connected by a path made up of one or more links, said stream being transported by said telecommunications network, which may include at least one radio segment on a portion of the path, the network being capable of transporting other IP streams over all or a portion of the path, the estimate of the available bandwidth being based on a single train of N IP/UDP packet frames generated at a certain send rate, and wherein said device comprises:

a receiver receiving said single train of N packet frames, a frame comprising: a field with the IP address of the send node, a field with the IP address of said receiver, a field associated with the send format of the frame, a packet of size L including a timestamp field referred to as the input transmitting time $t_n^i$, and a field with the number n of the packet corresponding to the number n of the frame in the train, for n=1 to N, reception of a frame n triggering the packet n being associated with a timestamp value referred to as the output receiving time $t_n^o$;

a processor, which is configured to performed acts of:

determining values of accumulated reception delays on reception of the respective packets n and starting from the second receive packet, with n=2 to N:

$$T_{(n-1)} = t_n^o - t_1^o$$

identifying atypical jitter values, $\text{Jitter}_{(n)}$ between the transmission delays of successive packets, $$\text{Jitter}_{(n-1)} = (t_{n+1}^o - t_{n+1}^i) - (t_n^o - t_n^i)$$

using a regression model applied to the accumulated reception delays as a function of an accumulated transmission delay taking account of the atypical jitter values in order to obtain an estimate of said available bandwidth $A_b$.

6. The apparatus according to claim 5, wherein said certain send rate generated by said send node is constant and wherein said processor using a regression model applies a linear regression model to the accumulated reception delays approximated by the relationship:

$$T_x = a_i x + b_i$$

for each segment i identified by two successive values of atypical jitter values, with $a_i$ being the slope and $b_i$ being the intercept of the segment i in order to obtain an estimate of said available bandwidth $A_b$ using the expression:

$$A_b = C_e \left(1 - \frac{a}{L} \text{Sendrate}\right) + \text{Sendrate}$$

with $C_e$ being an effective capacity, L a size of the packet and a being determined from the values $a_i$.

7. The apparatus according to claim 5, wherein said certain send rate generated by said send node is variable and wherein said processor using a regression model applies a non-linear regression model including searching for a breakpoint corresponding to a change of model, on the basis of determined accumulated reception delay values and on the basis of atypical jitter values, in order to determine an estimate of the bandwidth.

8. The apparatus according to claim 6, wherein the apparatus comprises a telecommunications system for performing the method of estimating available bandwidth at the level of the IP layer for a stream between the said send node and a destination node that are connected by a path made up of one or more links, and the system comprises:

the send node and the destination node connected by the path that may include at least one radio segment, wherein the destination node is the device according to claim 6.

9. The apparatus according to claim 7, wherein the apparatus comprises a telecommunications system for performing the method of estimating available bandwidth at the level of the IP layer for a stream between said send node and a destination node that are connected by a path made up of one or more links, and the system comprises:

said send node and said destination node connected by the path that may include at least one radio segment;

a stream transport link between the send node and the destination node that may include at least one radio segment, wherein the destination node is the device according to claim 7.

10. A non-transitory data medium including program instructions stored thereon for performing a method for estimating available bandwidth at a level of an IP layer for a stream between a send node and a destination node connected by a path made up of one or more links, when said program instructions are loaded in and executed by the destination node of a telecommunications system, wherein the network is capable of transporting other IP streams over all or a portion of the path, the estimation method making use of a single train of N IP/UDP packet frames generated at a certain send rate, and comprising:

a receive step of the destination node receiving the single train of N packet frames, a frame comprising: a field with the IP address of the send node, a field with the IP address of the destination node, a field associated with the send format of the frame, a packet of size L including a timestamp field referred to as the input transmitting time $t_n^i$, and a field with the number n of the packet corresponding to the number n of the frame in the train, for n=1 to N, reception of a frame n triggering the packet n being associated with a timestamp value referred to as the output receiving time $t_n^o$;

starting from the second received packet, a determination step of the destination node determining accumulated reception delay values on reception of the packet n, with n=2 to N:

$$T_{(n-1)} = t_n^o - t_1^o$$

an identification step of the destination node identifying atypical values of jitter, Jitter, between the transmission delays of successive packets, $$\text{Jitter}_{(n-1)} = (t_{n+1}^o - t_{n+1}^i) - (t_n^o - t_n^i)$$

a utilization step of the destination node using a regression model applied to the accumulated reception delays as a function of an accumulated transmission delay and taking account of the atypical jitter values.

* * * * *